Nov. 22, 1960 — W. N. MERRICK — 2,960,719
SHRIMP SORTING, DEVEINING AND SPLITTING MACHINE
Filed July 19, 1957 — 2 Sheets-Sheet 1

INVENTOR.
WALLACE N. MERRICK,
BY Linton and Linton
ATTORNEYS.

Nov. 22, 1960  W. N. MERRICK  2,960,719
SHRIMP SORTING, DEVEINING AND SPLITTING MACHINE
Filed July 19, 1957  2 Sheets-Sheet 2
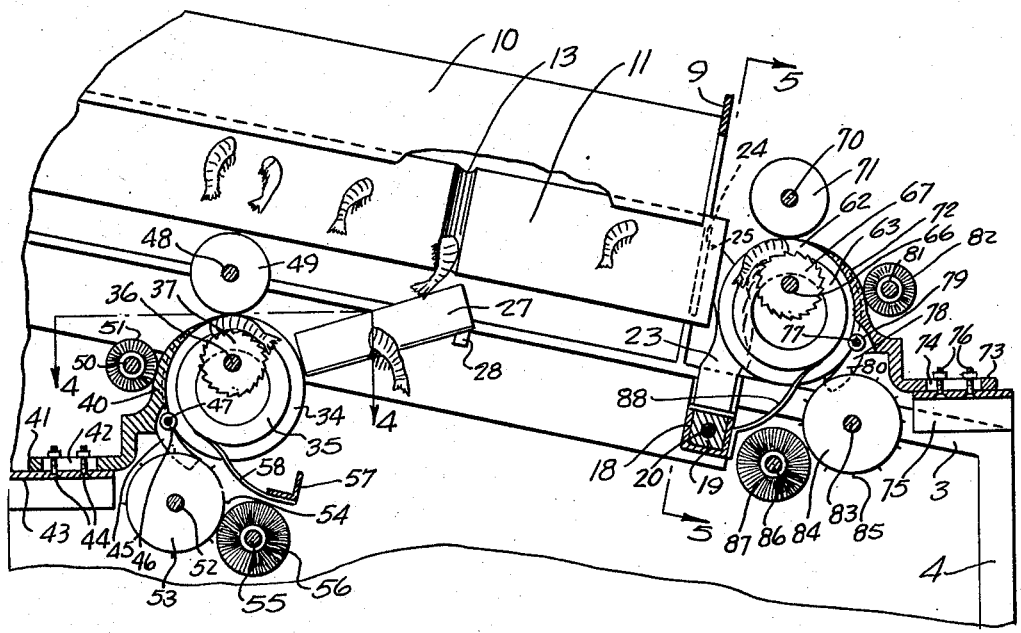
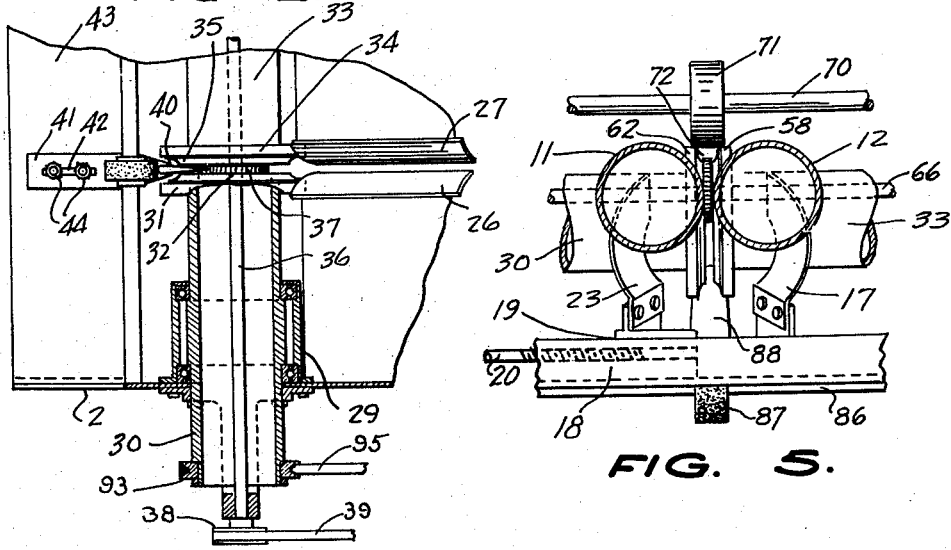
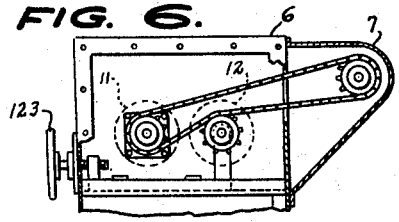
INVENTOR.
WALLACE N. MERRICK,
BY
ATTORNEYS.

United States Patent Office 2,960,719
Patented Nov. 22, 1960

2,960,719

SHRIMP SORTING, DEVEINING AND SPLITTING MACHINE

Wallace N. Merrick, 825 W. Jefferson, Harlingen, Tex.

Filed July 19, 1957, Ser. No. 673,004

8 Claims. (Cl. 17—2)

The present invention is related to machines for processing shrimp rendering the same more suitable for human consumption and it is a primary object of the invention to remove the legs, clean the sand vein of the shrimp, partially split the body meat along the length thereof and spread the split meat in succession.

Marine decapod crustaceans particularly those suitable for being eaten by humans, such as prawn and the larger shrimp have an alimentary tract containing waste matter known as a black or sand vein extending longitudinally along the back of the body meat which vein being unsuitable for human consumption should be removed prior thereto to render the meat safe and palatable for eating. In addition, once the vein has been cleared, the meat can be slit partially through the width thereof preparatory to spreading the meat apart as an aid to cooking the same. Further, the legs on a side of the body opposite to said tract are not desirable as food and should also be removed leaving only the body meat and tail which latter can be used in holding the meat during the consumption thereof. It is accordingly an important object of the invention to provide a machine to automatically and completely remove the body legs, clean the back alimentary tract and partially split the resulting body meat and which machine can handle large quantities of shrimp quickly and in succession rendering the machine suitable for commercial use.

A still further and equally important object of the present invention is to provide a machine for the processing of shrimp which can be introduced into the machine irrespective of their position and which machine will automatically position the shrimp for being delegged, deveined and split in succession by circular elements in a continuous manner.

Another object of the invention is to provide compact, closely coordinated and rotary elements for conveying the shrimp while being delegged, having the back alimentary track cleaned of waste matter, the shrimp body meat split partially through from said back towards the bottom thereof along the entire length of the shrimp, the split meat spread apart and brushed clean, with the deveining and splitting elements being readily adjustable for processing various sized shrimp and the deveining element thereof being self-cleaning.

Another important object of the invention is to provide a shrimp processing machine having a plurality of shrimp treatment devices for enabling large scale processing of the shrimp, which devices are associated with means for positioning the shrimp as required for handling by each of said devices and presented one after the other thereto by said means in the required position.

A further object of the invention is to provide a rotary conveyor of a configuration following the natural arc-shaped configuration of the shrimp for supporting and moving the shrimp in an annular path past delegging, deveining, splitting, spreading and brushing elements surrounding and coordinating with said conveyor for the processing of the shrimp.

Further objects of the invention will be in part obvious and in part pointed out in the following description of the accompanying drawings, wherein:

Fig. 3 is an enlarged detailed sectional view of a portion of the shrimp treating elements taken in a reversed direction to Fig. 2.

Fig. 4 is an enlarged top view partly in section of a portion of the lowermost end of the machine taken on line 4—4 of Fig. 3.

Fig. 5 is a cross sectional view taken on line 5—5 of Fig. 3.

Fig. 6 is a cross sectional view reduced size taken on line 6—6 of Fig. 2.

Figure 1:
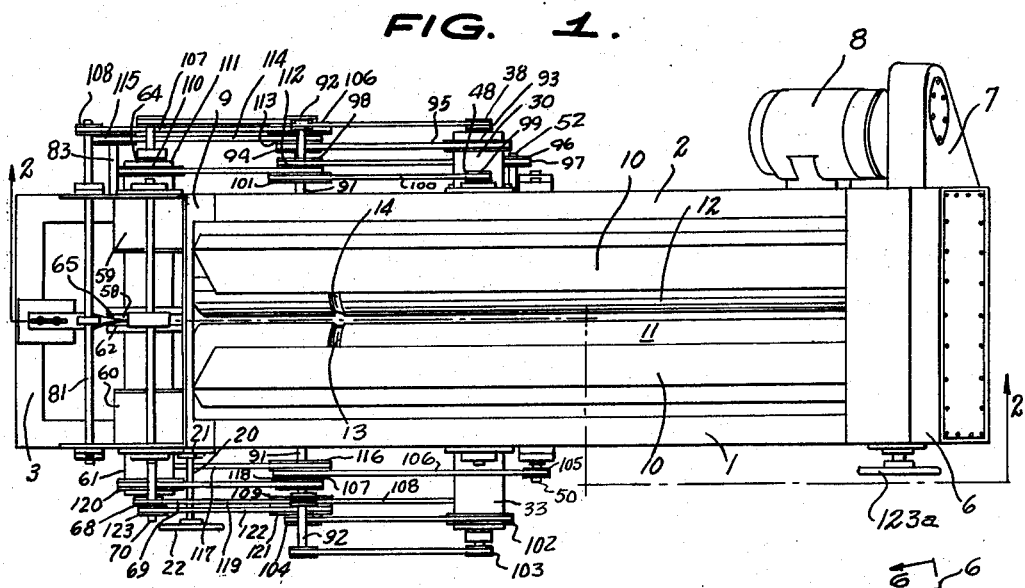
Fig. 1 is a top plan view of the present machine.

Referring now more particularly to the accompanying drawings wherein like and corresponding parts are designated by similar reference characters, numeral 1 refers to an elongated side of the machine, while numeral 2 indicates the opposite substantially parallel side. Said sides are connected at their lowermost ends by a U-shaped member 3 supported upon the ground or the like by a plurality of legs 4. Legs 5 which are of a greater length than legs 4 support the opposite ends of said sides above the lowermost end thereof whereby the sides 1 and 2 extend on a downward slant relative to the horizontal from legs 5 to leg 4.

The uppermost ends of said sides supported by legs 5 are connected by a housing 6 from one side of which extends a casing 7 through which extends a shaft of a driving motor for operating a mechanism (not shown) within said housing for a purpose to be explained hereinafter.

A U-shaped plate 9 has the ends of the legs thereof each mounted upon frames 1 and 2 respectively, while a pair of elongated guide members 10 are connected to and extend between said member 9 and housing 6.

Underneath each of said guide members is positioned one of a pair of elongated cylindrical rollers 11 and 12 which are rotatably supported within housing 6 and rotated in opposite directions by the mechanism within said housing which may be of any conventional constructions.

Each of said rollers 11 and 12 has a peripheral recess 13 and 14 respectively provided in the lower end portion thereof which recesses are positioned diametrically opposite to one another and each extend completely around the periphery of its roller while having a cross sectional configuration simulating one half of a cross section of a body portion of a shrimp. Thus, the recesses 13 and 14 each have a substantially semi-conoidal cross-sectional configuration with the point thereof on the upper side of the groove.

Roller 12 has a recessed lower end 15 in which is slidably positioned a thrust bearing 16 rotatably supporting the lower end of this roller. Said thrust bearing is mounted upon the end of a curved arm 17 fixedly mounted upon a channel member 18 extending between and connected to sides 1 and 2. Said channel member has a bar 19 slidably positioned therein through which extends a threaded shaft 20 in threaded engagement therewith which shaft extends through a bearing 21 in side 1 and is held against longitudinal movement by said bearing 21 and has an exterior hand wheel 22 for rotating said shaft and thus moving bar 19 longitudinally of channel 18.

Roller 11 has a recessed lower end 24 in which is mounted a thrust bearing 25 rotatably supporting the lower end of this roller and which bearing is mounted upon the end of a curved arm 23 fixedly mounted upon bar 19 for movement therewith.

A pair of substantially parallel spaced apart plates 26 and 27 extend longitudinally of rollers 11 and 12 but diverge downwardly therefrom and with their upper end below recesses 13 and 14. Said plates are supported by member 28 connected to and extending between sides 1 and 2.

A bearing 29 is fixedly connected to and extends substantially at right angles to side 2 while a tubular shaft 30 is rotatably supported by and extends through said bearing and side. One end of said tubular shaft has an annular lateral flange 31 with a curved side 32.

Figure 2:
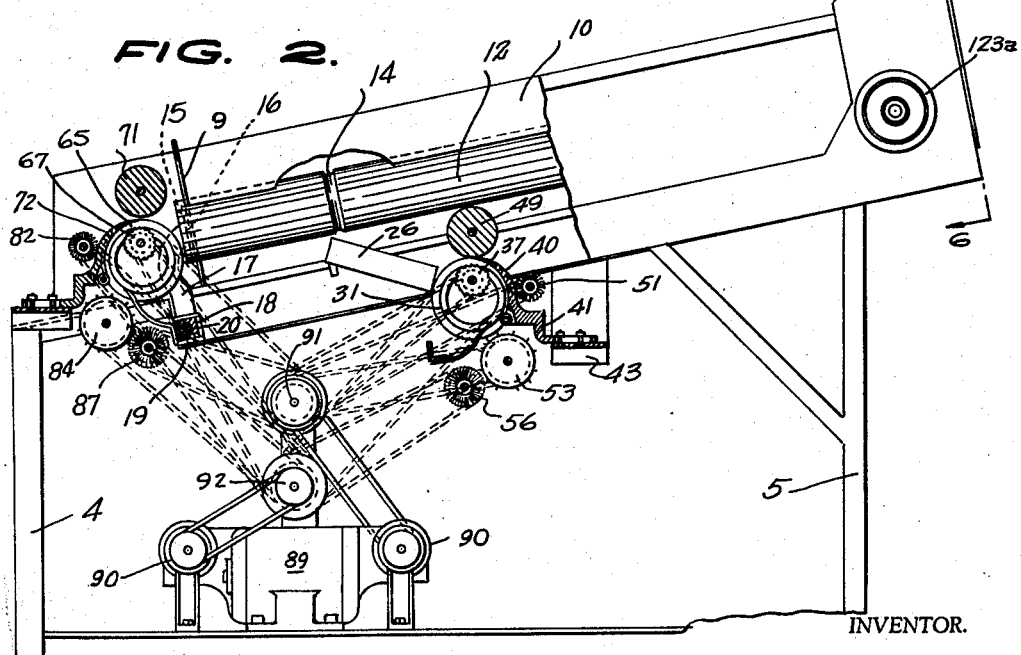
Fig. 2 is a side elevation of the machine with a portion in section to disclose inner elements.

A second tubular shaft 33 similarly is rotatably supported by a bearing connected to side 1 and has an annular lateral flange 34 with a curved side 35 facing side 32 of shaft 30 but spaced therefrom. A shaft 36 extends through the bore of shaft 30 and supports a toothed wheel 37 between said sides 32 and 35 with the top periphery of said wheel extending within the space between said sides as shown in Figs. 2 and 3. Shaft 36 has a pulley 38 fixedly mounted on one end having an endless belt 39 therearound.

A curved punch 40 having a wedge shaped longitudinal configuration also has a base 41 with a slot 42 mounted upon a hanger 43 connected to sides 1 and 2 while bolts 44 from said hanger extend through said slot for adjustably retaining base 41 thereon and positioning punch 40 extending between the peripheral edges of said flanges 31 and 34. Punch 40 further has a slot 45 provided on the inner face thereof in which is rotatably mounted a cutting disc 46 extending between said sides 32 and 35 upon the shaft 47 carried by said punch.

A shaft 48 rotatably extends through sides 1 and 2 and supports a roller 49 fixedly connected thereto above wheel 37 and in line therewith. A shaft 50 is rotatably supported upon sides 1 and 2 and carries an annular brush 51 fixedly connected thereto against the outer surface of punch 40.

A further shaft 52 is rotatably connected to sides 1 and 2 and has a toothed roller 53 positioned in line with and beneath cutting disc 46 for engaging and spreading shrimp cut by said disc. A further brush 56 is fixedly mounted upon a shaft 55 also rotatably connected to sides 1 and 2 and its periphery bears against roller 53 for directing the spread shrimp from said roller and removing severed material therefrom. An angle bar 57 extending between sides 1 and 2 supports a guide 58 extending to and between the lower portion of flanges 31 and 34 as shown in Fig. 3 for guiding the shrimp from said flanges to the periphery of roller 53.

A pair of bearings 59 and 60 are mounted upon end 3 with a tubular shaft 61 rotatably extending through bearing 60 having an annular lateral flange 62 with a curved end face 63. A second tubular shaft 64 rotatably extends through bearing 59 and has a lateral annular flange 65 with a curved side 58 facing, but spaced from, side 63 of flange 62.

A shaft 66 extends through the bore of the tubular shafts 61 and 64 and is rotatably supported upon the member 1. A toothed wheel 67 is fixedly mounted upon shaft 66 and the upper end portion thereof extends within the space between faces 63 and 65 of said tubular shafts. A pulley 68 is fixedly mounted upon one end of shaft 66 with an endless belt 69 therearound.

A further shaft 70 is supported above and is connected to a member 3 and has a roller 71 fixedly mounted thereon in line with and above wheel 67. A longitudinally curved punch 72 having a wedge shaped longitudinal cross sectional configuration has a base 73 with a slot 74. Said base 73 is slidably mounted on the end 75 of the member 3 which has bolts 76 extending through said base for at times retaining the same in desired positions. Punch 72 has a recess 78 in the inner face thereof with a shaft 77 extending thereacross rotatably supporting a cutting disc 79. Fingers 80 extend from said punch serving as a guide for the shrimp and also for assisting in splitting the spread meat.

A shaft 81 is rotatably supported on member 3 and has an annular brush 82 fixedly mounted thereon engaging punch 72 for cleansing severed material therefrom.

A further shaft 83 is rotatably connected to member 3 and has a toothed roller 84 fixedly mounted thereon with radially extending teeth 85. Said wheel 84 is positioned for receiving the meat from fingers 80 and drawing the same away and downwardly towards a brush fixedly mounted on shaft 86 which is also rotatably supported to member 3. A guide 88 mounted on member 18 extends between said tubular shafts for guiding the meat to wheel 84 and between the same and brush 87.

A driving motor 89 through means of reduction gears drives a pair of pulleys 90. Shafts 91 and 92 are rotatably supported above said motor for free rotation.

Belt 39 extends around a pulley fixedly mounted on shaft 91 for driving shaft 36. A pulley 68 is fixedly connected to an end of shaft 66 and has an endless belt 69 extending around a pulley fixedly mounted on shaft 92.

Pulley 93 is fixedly mounted on shaft 30 and connected by an endless belt 95 to a pulley 94 mounted on shaft 92. A pulley 96 is fixedly mounted on shaft 52 connected by an endless belt 97 to pulley 98 also fixedly mounted on shaft 91. Pulley 99 is fixedly mounted on shaft 48 and connected by endless belt 100 to pulley 101 fixedly mounted on shaft 91.

Pulley 102 fixedly connected to shaft 33 is connected by endless belt 103 to pulley 104 fixedly mounted on shaft 92. Pulley 105 fixedly mounted on shaft 50 connected by endless belt 106 to pulley 107 fixedly mounted on shaft 91. Endless belt 108 passing around pulley 109 fixedly connected to shaft 92 also passes around a pulley fixedly mounted to the end of shaft 55.

Pulley 110 fixedly mounted on the end of shaft 64 is connected by endless belt 111 to pulley 112 fixedly mounted on shaft 91. Pulley 113 fixedly mounted on shaft 92 is connected by endless belt 114 to pulley 115 fixedly mounted on the end of shaft 83. Pulley 116 is fixedly mounted on shaft 91 connected by an endless belt 117 to a pulley fixedly mounted on the end of shaft 86. Pulley 118 fixedly mounted on the end of shaft 91 is connected by an endless belt 119 to pulley 120 fixedly mounted on the end of shaft 61. Pulley 121 fixedly mounted on shaft 92 is connected by an endless belt 122 to a pulley 123 fixedly mounted on the end of shaft 70.

In the operation of the present machine motor 8 is energized causing the rotation of the rollers 11 and 12 toward one another as indicated in Fig. 5 whereby shrimp preferably deheaded can be distributed on to the guide plates 10 adjacent housing 6 at the upper end of the machine which provides the receiving station. The shrimp will tend to slide through gravity longitudinally of said rollers and as their body tapers downwardly from the head end to the tail, the tail portion of the shrimp being the narrower portion will be caused to extend through the space between said rollers with their tail end lowermost. The shrimp will continue to slide along said rollers until the peripheral recesses 13 and 14 are reached. At this position the shrimp will have assumed two positions, one with their feet directed towards housing 6 and second, those with their feet directed towards the lower ends of said rollers. Recesses 13 and 14 are of a configuration as hereinbefore described simulating approximately one half of the shrimp with their feet directed towards housing 6. Thus, the shrimp positioned in this manner upon reaching these recesses will pass therethrough due to the rotation of said rollers. However shrimp with their legs extending toward the lower end of the rollers cannot pass through the opening provided by these recesses as their back portion is wider than the apex of a substantially conoidal opening formed by said recesses and therefore such shrimp continue sliding downwardly to the lower end of said rollers.

The shrimp with their feet extending towards housing 6 which pass through said grooves will drop between the guide plates 26 and 27 which are spaced apart to allow only the tail end portion of the shrimp to extend therebetween. Consequently the shrimp will be guided downwardly by said plates towards the faces 32 and 35 of shafts 30 and 33 where they will be drawn by said faces due to the rotation of their shafts towards the space between roller 49 and wheel 37. Wheel 37 rotates in an opposite direction to shafts 30 and 33 and roller 49 with the result that the teeth thereof remove the feet from the lower portion of the shrimp body. However said shafts continue the shrimp beneath the punch 40 which enters the sand vein of the shrimp removing the undesirable material therefrom which material is removed by the brush 51. The curved punch 40 guides the shrimp to the cutting disc 46 which splits the meat partially therethrough. The size of the disc 46 can be varied by adjusting the position of base 41 to accommodate shrimp of various sizes. Fingers 45 tend to split the shrimp apart which is further flattened by the roller 53 and drawn by the teeth 54 past the brush 56 for being further cleansed thereby.

The shrimp continuing to the lower end of rollers 11 and 12 are received by the faces 62 and 55 of the shafts 61 and 64 and drawn therearound between the rollers 71 and the toothed wheel 67. Here again wheel 67 operates in an opposite direction to said shafts and rollers 71 remove the feet from the underside of the shrimp. Said shafts continue the shrimp whose sand vein is removed by the punch 72 passing therealong until the shrimp meets with cutting disc 77 which partially splits the meat thereof. Here again the size of the disc 77 can be varied and base 73 adjusted to accommodate the same. Fingers 80 tend to spread the meat which is engaged by roller 84 whose teeth pull the same along guide 88 past the brush 87 whereby the meat is further flattened and cleansed.

To adjust the distance between rollers 11 and 12, hand wheels 22 and 123a are operated for moving the slides supporting roller 11 moving the same to and from roller 12 for accommodating various sized shrimp.

Motor 89 drives the shafts 91 and 92 in opposite directions in order that the elements connected thereto will also operate in opposite directions.

The present device is capable of considerable modification and such changes thereto as come within the scope of the appended claims are deemed to be parts of the present invention.

I claim:

1. A shrimp processing machine comprising a pair of spaced apart rollers extending along side of one another and longitudinally on a slant to the horizontal, each of said rollers having an annular recess provided in the periphery thereof with the recesses of both rollers being diametrically opposite one another, said roller recesses providing an opening between said rollers of a configuration for the passage of shrimp of a corresponding cross-sectional configuration, at least one member positioned beneath said roller recesses for receiving and conveying the shrimp passing through said opening in a circular direction, and means positioned adjacent said member for removing waste material from the shrimp during its conveyance in said circular direction.

2. A shrimp processing machine comprising a pair of substantially parallel spaced apart rollers extending on an angle to the horizontal, said rollers each having a groove extending completely around the periphery thereof in a plane substantially perpendicular to the axis of its roller and said grooves each having a cross-sectional configuration simulating the cross-sectional configuration of a half of a shrimp, said rollers being adjustably supported with the space therebetween of a width only sufficient for the passage of the tail end portion of a shrimp and with said grooves opposing one another providing an opening for the passage of the entire shrimp only when said shrimp are positioned with their cross-sectional configuration being similar to that of said opening, circular means positioned below said opening for receiving shrimp passing through said opening and conveying the same through an arc, and members positioned around said means for removing portions of the shrimp unsuitable for food while being conveyed through said arc.

3. A shrimp processing machine as claimed in claim 2 wherein circular means are positioned at the lowermost end of said rollers for receiving shrimp which do not pass through said opening and are dispensed from said end of said rollers and conveying the shrimp through an arc, and members are provided around said second mentioned circular means for removing portions of the shrimp unsuitable for food while being conveyed through the latter mentioned arc.

4. A machine for processing shrimp comprising a pair of oppositely driven slanted cylindrical rollers positioned along side of one another and adjustably spaced apart providing an elongated slot therebetween capable of slidably receiving only the tail end portion of shrimp therebetween, said rollers having reduced opposing peripheral portions providing an enlargement in said slot of a configuration for passing through said enlargement only shrimp with its legs facing longitudinally of said slot towards the uppermost portion of said rollers, a second pair of driven rollers providing a groove between the adjacent ends thereof being positioned beneath and extending laterally of said first mentioned pair of rollers with said groove adjacent said slot enlargement for receiving the leg side of said shrimp passing therethrough and conveying the same therearound, means positioned around said groove provided between said second pair of rollers for engaging and removing portions of the shrimp carried thereby and means for receiving, conveying and removing portions of the shrimp passing from the lowermost end of said first mentioned pair of rollers.

5. A machine for processing shrimp comprising means for dispensing shrimp with their tail end portion lowermost and the legs of a series of the shrimp extending in a similar direction, a pair of driven cylindrical members positioned in line with their opposing ends spaced apart below said dispensing means in line with said direction of said shrimp legs for receiving the leg side of said shrimp and conveying the same therebetween in a partial circle, a driven toothed wheel positioned between said member ends for initially engaging and delegging the shrimp conveyed by said members, a curved punch adjustably mounted relative to said cylindrical members for moving through the sand vein of shrimp conveyed by members removing the waste material therein, a cutter disc rotatably carried by said punch and positioned for entering and partially splitting the shrimp meat after the removal of said sand vein and means positioned adjacent said cylindrical members opposing ends for spreading said split meat.

6. A machine for processing shrimp as claimed in claim 5, wherein a driven roller is positioned adjacent said members ends and said toothed wheel for pressing shrimp on said ends against said toothed wheel.

7. A machine for processing shrimp as claimed in claim 5, wherein each of said driven cylindrical members has a laterally extending flange adjacent the opposing ends of said members with the flanges of both members spaced apart for receiving and retaining shrimp therebetween.

8. A machine for processing shrimp as claimed in claim 5, wherein said dispensing means includes members having an elongated slot therebetween capable of slidably receiving only the tail end portion of said shrimp and an opening in communication with said slot of a configuration for the passage only of shrimp whose legs extend towards said cylindrical members and a pair of spaced guide plates slanting from said opening to said cylindrical member ends for guiding and passing shrimp from said members opening to said cylindrical members while retaining said shrimp with their legs extending towards said cylindrical members.

References Cited in the file of this patent

UNITED STATES PATENTS

| | | |
|---|---|---|
| 1,750,329 | Patchen et al. | Mar. 11, 1930 |
| 2,702,921 | Pinney | Mar. 1, 1955 |
| 2,716,776 | Streich et al. | Sept. 6, 1955 |
| 2,760,225 | Miller | Aug. 28, 1956 |
| 2,784,450 | Jonsson | Mar. 12, 1957 |
| 2,815,117 | Lapeyre et al. | Dec. 3, 1957 |